March 21, 1950     C. L. BEWARD     2,501,493
VEHICLE TIRE AND TREAD THEREFOR
Original Filed Feb. 2, 1942
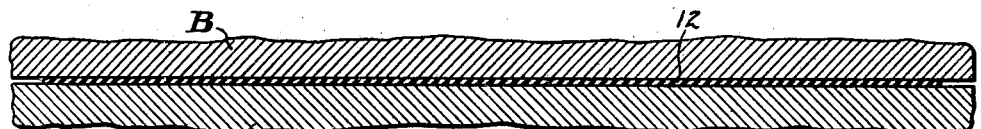
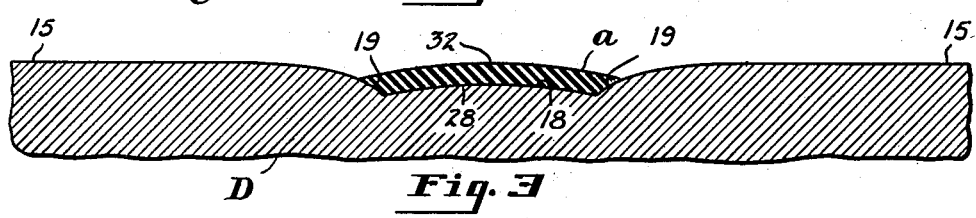
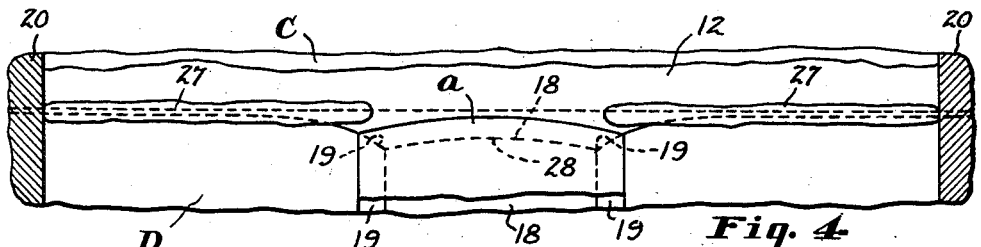
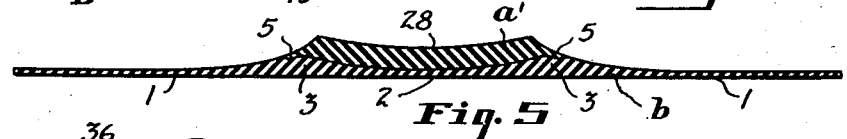
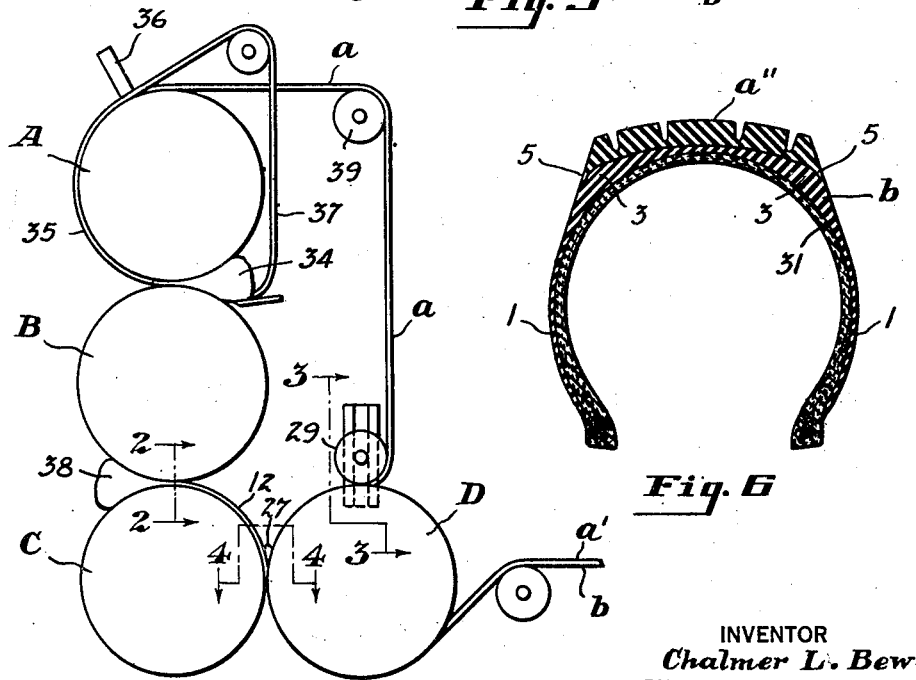
INVENTOR
Chalmer L. Beward
BY Evans & McCoy
ATTORNEYS Patented Mar. 21, 1950

2,501,493

UNITED STATES PATENT OFFICE 2,501,493

VEHICLE TIRE AND TREAD THEREFOR

Chalmer L. Beward, Akron, Ohio, assignor to The General Tire & Rubber Company, Akron, Ohio, a corporation of Ohio Original application February 2, 1942, Serial No. 429,140. Divided and this application August 23, 1944, Serial No. 550,718

5 Claims. (Cl. 152—354)

This application is a division of my copending application Serial No. 429,140, filed February 2, 1942, which has matured into Patent 2,437,873 March 16, 1948. The invention relates to vehicle tires and to composite tread and side wall strips for application to tire carcasses on a building drum.

In usual practice, the tread and outer side walls of a tire are formed of a single strip of rubber compound which is cut to the proper length, applied upon and vulcanized to the fabric carcass of the tire. The rubber compound from which the wear-resistant tread portion of the tire is formed should have a relatively heavy loading of carbon black to increase its wearing properties. The covering for the side wall portions of the tire, however, are preferably of a softer, more elastic rubber compound to provide increased resistance to flex-cracking. Also, a softer rubber adjacent the tire carcass provides better adhesion to the carcass.

Heretofore, it has been proposed to form the composite tread and side wall strips of two different rubber compositions, with the medial relatively thick body portion of the strip from which the tread in the finished article is to be formed of a relatively hard composition and with the relatively thin side margins of the strip, which are adapted in the finished article to form the side walls of the tire, of a softer composition.

In the manufacture of composite tread and side wall strips heretofore proposed, the base of the composite strip, consisting of the marginal portions for formation of the side walls and an intermediate connecting web portion, is preformed in substantially the shape desired in the final article so that it will receive a separately preformed tread strip without appreciable deformation. Composite strips formed in this manner, wherein there is an abrupt juncture between the relatively hard tread strip and the softer marginal portions, are undesirable for the reason that concentration of stress is likely to occur at this abrupt juncture to cause cracking and separation of the tread portion from the side wall portion of the finished article.

It is therefore an object of the present invention to provide a composite tread and side wall strip having a relatively hard, wear-resistant medial portion and a softer base portion wherein there is no abrupt termination of the medial tread portion into the marginal base portion.

It is a still further object to provide a tire having a hard, wear-resistant tread and softer side wall coverings connected by a web and having increased interfacial area between the vulcanized compounds of the tread and side wall portions.

Other objects will be apparent from the following detailed description of the invention as evidenced by the accompanying drawings, in which:

Figure 1 is a diagrammatic side elevational view of apparatus which may be used in producing composite strips of the present invention;

Fig. 2 is a sectional view on the line 2—2 of Fig. 1;

Fig. 3 is a sectional view on the line 3—3 of Fig. 1;

Fig. 4 is a top plan view of a portion of the apparatus seen from lines 4—4 of Fig. 1, showing the two rubber compounds used in forming the composite strip at the moment of their union;

Fig. 5 is a sectional view through a composite tread and side wall strip embodying the present invention; and Fig. 6 is a sectional view through a portion of a tire embodying the present invention.

Referring to the drawing, and more particularly to Fig. 5, composite strips of the present invention have a central tread portion $a'$ of relatively highly loaded wear-resistant rubber compound and a base portion $b$, preferably of more flexible and of relatively softer rubber compound. The tread strip has greater width than height, the width about corresponding to the tread of the tire to be formed. It may have a rectangular cross section or, preferably, a trapezoidal cross section with relatively sharp edges, the lower face being wider than the upper face.

The base portion $b$ comprises marginal portions 1 adapted to form the covering for the side wall of the completed tire. The marginal portions are connected by a central web portion 2, which serves to connect the tread portion $a'$ with the tire carcass. The marginal portions 1 are usually relatively thin at their outer edges and increase in thickness towards the center of the strip, with maximum thickness reached in longitudinal ridges 3 in the neighborhood of the juncture of the marginal portions with the tread portion. The ridges 3 are positioned in the composite tread so that when the tread is applied to the tire carcass they will lie in the shoulder portions of the tire. The web portion 2 preferably falls away in thickness from the ridges 3 to provide a channel in which the major portion of the strip $a$ is carried to form the tread portion $a'$ of the composite strip. The tread portion $a'$ overlies and is strongly bonded to the web portion of the base $b$ between the ridges 3.

According to the present invention, the tread portion has marginal edge portions 5 which are preferably tapered and overlie the ridges 3, so that when the composite strip is molded in a tire, the wear-resistant tread compound of the edge portions 5 extends beyond the shoulder and partway up the side wall of the tire. The interface between the rubber compound of the tread portion a' and the rubber compound of the base b preferably is uneven or contains undulations as when the compounds were subject to flow after contact. The undulations or roughness of the surface provide larger interfacial area between the compounds of the tread portion a' and the base b than when both the tread portion and the base are separately formed to final shape with smooth surfaces and simply pressed together. The undulations in the tread and base portions are complemental as when the tread strip is united to the base strip under calendering pressure and under conditions of turbulence in accordance with the method hereinafter set forth.

Referring particularly to Figs. 1 to 4, inclusive, suitable apparatus for forming the composite treads of the present invention may comprise means for forming the tread strip a in the desired shape, means such as coacting rolls in a suitable calender for forming a rubber compound into a relatively flat strip having greater width than the tread strip, and means including a contour roll and a backing roll for shaping the rubber of the flat strip into the form it occupies in the base portion of the composite strip and for substantially simultaneously uniting the preformed tread portion a thereto under calender pressure and preferably under conditions of turbulence or flow, in at least one rubber compound forming the composite strip.

The calender preferably used is of the four-roll contour type, having rolls A, B, C and D arranged in conventional manner. One calender roll, D, is shaped to substantially the contour desired for the upper surface of a composite strip suitable for application on a drum to a tire carcass. The rolls A, B and C, the latter serving as a backing roll for the contour roll D, may be of conventional cylindrical form.

The tread strip is formed from the bank of rubber 34 supplied to the bight between rolls A and B. The roll A preferably has greater speed than has intermediate roll B and the sheeted tread compound 35 is carried over the top of the roll A, where it is trimmed or skived to suitable width and shape by the trimmer 36. The stock 37 trimmed from the edges of the strip a is returned to the bank of rubber 34. The base strip 12 of sheeted flexible compound for forming the base b of the composite tread is formed from the bank 38 by the interaction of the rolls B and C. The speed of rolls C and D is approximately equal and greater than the speed of intermediate roll B. The speed of the upper roll A is preferably somewhat less than that of rolls C and D to compensate for the stretch imparted in the strip a by the roll 29 which cooperates with the roll D. Since the usual calender is several times wider than the width of the composite strip, separating blocks may be interposed between portions of the rolls so that a single pair of rolls may serve both to calender and to warm-up the supply of rubber compound for bank 34 or 38, if desired.

The contour roll D may have cylindrical end portions 15 and an intermediate formed portion between suitable stops 20 of the width desired for the composite tread and side wall strips of the present invention. The formed portion has an annular groove or channel, preferably having convexlike or rounded annular bottom face 18 and outwardly inclining sides 19. The channel 28 is suitably shaped to receive the preformed tread strip a. The diameter of the roll D preferably is smallest at the juncture of the base 18 with the sides 19 of the channel and becomes progressively larger until the maximum diameter of the cylindrical portion 15 is reached. The opening between the coacting rolls C and D corresponds substantially to the cross section of the desired composite strip taking into account the elasticity of the compound. The stops 20 provided in the bight between rolls C and D decrease the tendency for flow of rubber toward the end of the rolls; the distance between the stops 20 may be adjusted to equal or exceed the overall width desired in the composite strip. If the calendered width of the composite strip is greater than desired, suitable trimmers (not shown) may be provided to trim excess flexible stock from the outer edges of the marginal portions 1.

In the formation of composite strips embodying the present invention, the base portion and the tread portion are united under calender pressure. Rubber compound of a type suitable for forming the side wall portion of the composite strip may be continuously fed from a suitable source, not shown, such as a warm-up mill, into the bight and between the intermediate and lower rolls B and C, respectively. The amount of rubber in the bight is sufficient to provide a suitable bank 38 and the rubber compound emerging from between the rolls B and C may be in the form of a flat sheet 12 having substantially the average thickness of the base portion b of the opposite strip, so that the small bank of rubber formed by operation of rolls C and D remains of substantially constant size. The thickness of the relatively flat base strip 12 is greater than the thickness of the edge portions of the marginal portions 1 of the composite strip, so that when the compound of the strip 12 passes between the contour roll D and the backing roll C the small bank 27 of the compound 12 is formed and a flow of the compound 12 toward the medial portion of the contour roll D takes place to assist in forming the longitudinal ridges 3 and to cause turbulence at the interface between the tread strip a and the base portion b.

Means is provided for feeding or incorporating the preformed tread strip a into the annular channel of the contour roll with its narrower or upper face 28 in contact with the bottom curved portion 18 of the channel and for applying tension thereto to cause it to conform to the shape of the groove. This means may comprise a suitable tension roll 29 which is rotatably carried in suitable slides and is adapted to ride on the roll D. The preformed tread strip a from the roll A is passed under roll 29 and over the roll D, and by the tension due to the drag of the roll 29 it is pulled into the channel 17 and into conformity with the rounded base 18 thereof. The tread strip a in the channel on the roll D is carried into contact with the sheeted rubber compound 12 on the roll C and united thereto under calendering pressure. Probably due to the fact that the outer medial portion 32 (Fig. 3) of the strip a on the roll D travels at a somewhat greater speed than the marginal portions of the strip a, due to the larger diameter of the base of the channel 28 at its medial portion, there appears to be a somewhat higher pressure on the medial portion of the strip $a$ than at its edges. This differential pressure or differential in flow resistance causes flow of the compound thereof toward the end portions and beyond. The flow of the compound from the strip $a$ towards the ends of the roll D meeting with the opposite flow of the rubber from the bank 27 toward the axis or medial portion of the composite strip apparently causes some turbulence at the interface between the strips $a$ and $b$ with the result that the two compounds are worked together so that a wavy interface and excellent adhesion are obtained.

When the tread strip and the base are united in this manner, it has been found that the flow of the flexible compound 12 from the bank 27 automatically provides the desired ridges 3 at the shoulder portions of the composite tread. It has also been found that when the preformed strip $a$ is united to the base $b$ in this manner, the compound of the preformed strip $a$ flows laterally along the contour roll to provide tapered edges 5 which overlie or tend to overlie the ridges 3 of the base portion, thus preventing abrupt termination of the medial tread portion $a'$.

Because of the turbulence of the bank 27 and the flow of the compound in the strip $a$, undulations are produced over the major portion of the interface between the tread portion $a'$ and the base portion $b$. These undulations further alleviate any tendency of separation of the tread from the side wall stock of the tires produced.

Referring particularly to Fig. 6, the tires embodying the present invention may comprise a carcass of conventional form having a number of plies of stretch-resistant elements extending between the beads, the stretch-resistant elements in alternate plies being substantially parallel and at an angle to those in adjacent plies as in conventional tires. When the composite strip illustrated in Fig. 5 is suitably incorporated in the tire, it is seen that the side wall rubber compound 1 of the side wall covering extends continuously over the crown of the tire from adjacent the beads. The relatively thick ridges 3 in which the side walls terminate form a thickened shoulder adjacent the edges of the road-contacting surface thereof. The wear-resistant tread compound $a''$ which forms the tread of the tire extends over the shoulders with the interface and the marginal portions 5 extending partly up onto the side walls to provide extra protection for the side walls adjacent the shoulder.

Furthermore, it is to be understood that the particular form of product shown and described and the particular procedure set forth are presented for purposes of explanation and illustration and that various modifications of said product and procedure can be made without departing from my invention as defined in the appended claims.

What I claim is:

1. A composite strip for forming the tread and side wall coverings of a vehicle tire, comprising a central tread portion of a wear-resistant rubber compound and a base portion of a second and different rubber compound, said base portion having marginal portions for forming the side wall coverings of a tire, one marginal portion extending beyond each side edge of said tread portion and being relatively thin at its outer edges, the inner edge of each marginal portion terminating in a longitudinal ridge, and a central web portion underlying said tread portion and connecting said marginal portions through said longitudinal ridges, said tread portion overlying said web portion and having marginal edge portions which overlie said ridges and part of said marginal portions, side portions of the interface between said tread and base portions having all the characteristics of interfaces between compounds identical to those of said tread and base portions which are forced together under pressure, while portions of at least one of said compounds first contacting the other compound are in the state of the turbulent flow of a bank of rubberlike material between spaced portions of pressure rolls.

2. A composite strip for forming the tread and side wall coverings of a vehicle tire, comprising a central tread portion of a wear-resistant rubber compound and a base portion of a second and different rubber compound, said base portion having marginal portions for forming the side wall coverings of a tire, one marginal portion extending beyond each side edge of said tread portion and being relatively thin at its outer edges, the inner edge of each marginal portion terminating in a longitudinal ridge, and a central web portion underlying said tread portion and connecting said marginal portions through said longitudinal ridges, said tread portion overlying said web portion and having tapered marginal edge portions which overlie said ridges and part of said marginal portions, the width of the interface between said tread portion and said base portion being greater than the width of the bonded face of the tread portion as separately formed, side portions of the interface between said tread and base portions having all the characteristics of interfaces between compounds identical to those of said tread and base portions which are forced together under pressure, while portions of at least one of said compounds first contacting the other compound are in the state of the turbulent flow of a bank of rubberlike material between spaced portions of pressure rolls.

3. A composite strip for forming the tread and side wall coverings of a vehicle tire, comprising a central tread portion of a wear-resistant rubber compound and a base portion of a second and different rubber compound, said base portion having marginal portions for forming the side wall coverings of a tire, one marginal portion extending beyond each side edge of said tread portion and being relatively thin at its outer edges, the inner edge of each marginal portion terminating in a longitudinal ridge, and a central web portion underlying said tread portion and connecting said marginal portions through said longitudinal ridges, said tread portion overlying said web portion and having tapered marginal edge portions which overlie said ridges and part of said marginal portions, side portions of the interface between said tread and base portions having all the characteristics of interfaces between compounds identical to those of said tread and base portions which are forced together under pressure, while portions of at least one of said compounds first contacting the other compound are in the state of the turbulent flow of a bank of rubberlike material between spaced portions of pressure rolls.

4. A pneumatic vehicle tire comprising a tire carcass containing stretch-resisting elements extending between substantially inextensible beads, side wall coverings of a suitable flex-resisting rubber compound and a tread or road-contacting portion of another and different rubber compound, the rubber compound of said side wall coverings extending substantially from bead to bead, one edge of each side wall terminating adjacent an edge of the road-contacting surface in a shoulder containing a thickened ridge of substantially the same compound as said side wall, a web of the side wall compound connecting the ridges of said shoulders and underlying said tread portion, portions of said tread portion being bonded to said underlying web portion and to said ridges, the interface between the compound of said tread portion and said side wall compound extending over said shoulder and partway up said side walls, side portions of the interface between said tread and base portions having all the characteristics of interfaces between compounds identical to those of said tread and base portions which are forced together under pressure, while portions of at least one of said compounds first contacting the other compound are in the state of the turbulent flow of a bank of rubberlike material between spaced portions of pressure rolls.

5. A pneumatic vehicle tire comprising a tire carcass containing stretch-resisting elements extending between substantially inextensible beads, side wall coverings of a suitable flex-resisting rubber compound and a tread or road-contacting portion of another and different rubber compound, the rubber compound of said side wall coverings extending substantially from bead to bead, one edge of each side wall terminating adjacent an edge of the road-contacting surface in a shoulder containing a thickened ridge of substantially the same compound as said side wall, a web of the side wall compound connecting the ridges of said shoulders and underlying said tread portion, said tread portion overlying said web and said thickened ridges of said shoulders, and side portions of the interface between said tread and base portions having all the characteristics of interfaces between compounds identical to those of said tread and base portions which are forced together under pressure, while portions of at least one of said compounds first contacting the other compound are in the state of the turbulent flow of a bank of rubberlike material between spaced portions of pressure rolls.

CHALMER L. BEWARD.

REFERENCES CITED

The following references are of record in the file of this patent:

UNITED STATES PATENTS

| Number | Name | Date |
|---|---|---|
| Re. 22,080 | Bowers | Apr. 29, 1942 |
| 1,268,437 | Clough | June 4, 1918 |
| 1,276,875 | Colby | Aug. 27, 1918 |
| 1,352,164 | Yelm | Sept. 7, 1920 |
| 1,357,098 | Kryder | Oct. 26, 1920 |
| 1,403,058 | Pushee | Jan. 10, 1922 |
| 1,954,926 | Fraser | Apr. 17, 1934 |
| 2,177,165 | Beckman | Oct. 24, 1939 |
| 2,228,212 | Heintz | Jan. 7, 1941 |
| 2,232,488 | Smith | Feb. 18, 1941 |